[19] United States Patent
Graham et al.

[11] 3,932,309
[45] Jan. 13, 1976

[54] AUTO EXHAUST CATALYSTS PREPARED FROM SULFITE TREATED PLATINUM AND PALLADIUM SALT SOLUTIONS

[75] Inventors: James Richard Graham, Columbia; Michael Vance Ernest, Baltimore; James Michael Maselli, Ellicott City, all of Md.

[73] Assignee: W. R. Grace & Co., New York, N.Y.

[22] Filed: June 5, 1974

[21] Appl. No.: 476,505

[52] U.S. Cl............................... 252/439; 423/213.5
[51] Int. Cl.$^2$......................................... B01J 27/02
[58] Field of Search..................................... 252/439

[56] References Cited
UNITED STATES PATENTS
3,636,029   1/1972   Smith.............................. 252/439 X
3,803,054   4/1974   Habig et al. ........................ 252/439

Primary Examiner—Patrick P. Garvin
Attorney, Agent, or Firm—Joseph P. Nigon

[57] ABSTRACT

A process for preparing a catalyst that has improved activity and efficiency for conversion of hydrocarbons is disclosed. The catalyst is prepared by applying sulfito complexes have the emperical formula $M_6(x)$.$(SO_3)_4$ where M is H+, NA+, K+ or $NH_4$+ and x is platinum, palladium or mixtures thereof. In addition, the compounds $M_2(x) (SO_3)_2$ and $M_2(x) (SO_3)_2$ also have utility in our process. The complex salt is impregnated onto a support and activated by calcination in air or heating in a reducing atmosphere.

6 Claims, No Drawings

AUTO EXHAUST CATALYSTS PREPARED FROM SULFITE TREATED PLATINUM AND PALLADIUM SALT SOLUTIONS

BACKGROUND OF THE INVENTION

The problem of air pollution is not a new one. However, the problem has become more and more serious in many cities in recent years. Most of the pollution is a result of compounds which are derived from unburned or partially burned hydrocarbons found in the exhaust of internal combustion engines.

It is well known that noble metal such as platinum and palladium and combination of these metals have been and are currently being used in catalysts for the control of auto exhaust emissions. A wide variety of of activities can be achieved dependent on the choice noble metal salt used in the preparation. Since the use of noble metal auto exhaust catalysts is controlled to a great extend by cost, small amounts of noble metals must be used to maximum advantage. This means that the location and distribution of noble metals are of utmost importance in determining the intrinsic activity of the catalyst.

Several patents have been issued that disclose and claim conversion of exhaust gases to innocuous entities in the presence of platinum and palladium catalysts. In addition to being the principal components of these catalysts several of the noble metals are used in small amounts to promote activity of base metal systems. U.S. Pat. No. 3,189,563 of Hauel, isssued June 15, 1965, is typical of the patents relating to the use of noble metal catalysts for the conversion of automobile exhaust gases. U.S. Pat. No. 3,455,843 to Briggs et al, issued July 15, 1969, is typical of a base metal catalyst system promoted with noble metal. Unpromoted base metal catalysts have been described in U.S. Pat. No. 3,322,491 by Barrett et al., issued May 30, 1967.

Normally the activity of a noble metal carbon monoxide and/or hydrocarbon oxidation catalyst can be increased by maximizing the dispersion of the noble metals. However, when the catalyst is used in an auto exhaust stream where gas velocities are high and contact times are short, the availability of the noble metal appears to be more crucial to high acitivity than the extent of dispersion. The reasons for this is that the rate of oxidation of carbon monoxide and hydrocarbons may be diffusion controlled. It is well known that a pelleted or balled catalyst operating under very high space velocity conditions, makes use of only the outer 5 to 10% of its volume for catalyzing the oxidation of hydrocarbons and carbon monoxide. Therefore, the best possible catalyst as far as performance is concerned is one in which the noble metals are located in the outer 5 to 10% of the pellet volume and one that is highly dispersed.

BRIEF DESCRIPTION OF THE INVENTION

We have found that if platinum and palladium are applied to a pelleted catalyst by means of a sulfito complex this high degree of dispersion and availability of the platinum and palladium results. These compounds have the emperical formula $M_6(x)(SO_3)_4$ wherein M is $Na+$, $K+$ or $NH_4+$, and x is platinum, palladium or mixtures thereof. The disulfito complexes, $M_2(x)(SO_3)_2$ and $M_2(x)(SO_3)_2(NH_3)_2$, can also be used in our process. The catalysts prepared using these sulfito complexes were found to have noble metals located near the surface of the pellet and have these noble metals moderately well dispersed.

DETAILED DESCRIPTION OF THE INVENTION

The first step of the process is the preparation of the sulfito complexes of platinum and palladium described above. Both platinum and palladium, unlike most metals, coordinate with the sulfite group, $SO_3^=$, in a monodentate fashion. Since both divalent platinum and divalent palladium prefer a square planar configuration, each metal can accommodate four sulfito groups. This opens up the unique possibility that the sulfito group can act as a bridging ligand and coordinate to two platinum atoms, to two palladium atoms or to a platinum and a palladium atom. Therefore, these sulfito complexes can be monomeric, dimeric or polymeric depending on the amount of bridging that takes place. The size of the noble metal sulfito polymer can be controlled by controlling the number of sulfite groups removed from the complex.

These large highly charged molecules, when impregnated onto pelleted supports, have little tendency to enter small pores in the support and probably decompose at the mouth of the pore or in very large pores. These large highly charged molecules also deposit very near the surface of the pellet in a reasonably dispersed manner. Both of these factors help prevent the rate of oxidation of CO and HC from being diffusion controlled and result in a catalyst of exceptionally high efficiency, especially with regard to control of auto exhaust emissions.

The first step in the preparation of our highly active and efficient catalyst is the selection of a suitable base. The preferred base is alumina or an alumina containing compound such as bauxite or the ultra stable base prepared by activating and stabilizing common alumina with metal oxides such as cerium oxide or other rare earth metal oxides at high temperatures prior to application of the noble metals.

The method of preparing this base is not part of this invention. Very briefly, the process consists of contacting suitable carrier supports such as mullite, spinel, silica, or alumina with a solution of a salt of a mixed rare earth, or more specifically a cerium salt in a quantity such that the final catalyst will contain from about 3 to about 10%, preferably about 5 weight percent cerium oxide expressed as $Ce_2O_3$. The support is then dried at a temperature of about 300°C. for about 6 hours followed by calcination at a temperature 1850° to 1950°F. for about 1 hour. The resulting activated and stabilized support has a surface area of about 75 to 125m²/g.

The next step of the process is the preparation of the solutions of platinum and palladium sulfito complexes. The method of preparing the complexes, of course, depends on the complex desired. These complexes can be readily prepared from chloroplatinic acid and palladium nitrate. In the process for preparing the alkali metal platinum sulfito complex or the alkali metal palladium/platinum sulfito complex the chloroplatinic acid and palladium nitrate solutions are prepared and treated with an excess of sodium bisulfite ($NaHSO_3$). The pH of the solution is increased to 8 by the addition of sodium carbonate.

The sodium bisulfite acts both as a reducing agent for the tetravalent platinum and as a complexing agent for the platinum and palladium. The alkali metal, preferably sodium, platinum sulfito complex and the mixed sodium palladium platinum sulfito complex are readily precipitated from the basic solution as a white or light yellow salt. This sodium palladium sulfito complex has a considerable solubility in basic solutions, but can be precipitated by cooling the solution. The addition of either acetone or ethanol decreases the solubility of the sulfito complexes in water.

After the salts have been precipitated they are filtered, washed with cold, very dilute, ammonia solution, and finally with acetone. The resulting stable complexes can be dried at 100°C. for periods of ½ to 2 hours. These complexes are thermally stable to temperatures above 300°C. and thus can be easily handled in the laboratory.

Another convenient method of preparing the mixed sulfito complex is to start with a metal sponge. In the first step of this preparation a mixture of platinum and palladium metal in sponge form is dissolved in the mixture of hydrochloric and nitric acids known as aqua regia. The dissolution is accomplished by heating the metals until the excess acid is boiled off. At that point the solution is diluted and filtered to remove undissolved metals. The pH of the solution is raised to about 5 with sodium carbonate and an excess of sodium bisulfite solution is added. The ph of the solution is raised to about 8 with sodium carbonate. After filtering, washing and drying the sodium salt of the mixed platinum and palladium complex is recovered. A greater than 90% yield of the complex is recovered using this technique.

The ammonium salts of the platinum and palladium sulfito complexes are also prepared from chloroplatinic acid and palladium nitrate solution, respectively. The ammonium platinum sulfito complex is prepared by treating chloroplatinic acid solution with an excess of ammonium bisulfite. Immediate precipitation of a white solid occurs after which a saturated solution of ammonium carbonate and ammonium hydroxide is added to make the pH basic. The slurry is cooled to 10°C. in an ice bath to decrease the solubility of this complex. The slurry is then filtered. The filter cake is reslurried with ammonium carbonate and ammonium hydroxide solution, and refiltered, and then washed with ethanol and dried in a vacuum oven. This complex is readily soluble in water and is stable to 250°C.

It has also been found that the specific complexes need not be isolated in order to prepare catalysts of good performance. Impregnating solutions of the complexes may be prepared by dissolving chloroplatinic acid in deionized water and bringing the solution to a boil. A small amount of the bisulfite solution (either sodium, ammonium or potassium) is added. A color change from orange to yellow to colorless occurs rapidly after which boiling is continued for 5 minutes. The solution is then cooled to room temperature. The desired amount of palladium nitrate is then added and the solution is ready to use for impregnating the base.

It has been found that a satisfactory complex may also be prepared using a simplified procedure. In this procedure the aqueous solution of chloroplatinic acid is heated to boiling temperature, sulfur dioxide is bubbled into the boiling solution and after an appropriate period of time (after the solution changes from orange to colorless) the addition of $SO_2$ is discontinued and the boiling is continued for an additional 5 minutes.

The solution is cooled to room temperature. If the solution is to contain palladium, then an appropriate quantity of palladium nitrate is added to the cooled solution. The solution is then ready to be used for impregnating the base.

The catalyst is prepared by cladding or impregnating the support with solutions of the mixed sulfito complex prepared by any of the methods disclosed above or of the individual platinum and palladium sulfito complexes. The impregnation may be made with a solution prepared by dissolving the complex in a suitable solvent. However, the complex can also be prepared in situ as pointed out above and need not be isolated during catalyst preparation.

After impregnation the catalyst is dried and activated. Activation may be carried out by either heating in air at temperatures of 800° to 1400°F. for periods of 1–4 hours or heating in a reducing environment such as hydrogen for ½ to 2 hours at 600°–800°F. A particularly satisfactory catalyst is obtained by calcination of the impregnated support at temperatures of 800° to 1200°F. for periods of 1 to 2 hours. The noble metals are present in the catalyst to the extent of 0.02 to 0.08% by weight based on the total weight of the catalyst.

The catalytic performance of the system was evaluated by both bench scale testing, as well as full-size engine tests. The engine test which was carried out employs a full-size catalytic converter similar to that which will be used on production vehicles equipped with catalytic hardware. This test is described in detail in a publication of the *Society of Automotive Engineers* entitled, "An Engine Dynamometer System for the Measurement of Converter Performance", by D. M. Herod, et al., that was presented at the Automotive Engineering Meeting in Detroit, Mich., on May 14–18, 1973, available from the Society of Automotive Engineers, Inc., Two Pennsylvannia Plaza, New York. N.Y. 10001 and is incorporated herein by reference. The essential feature of this process is the segmenting of the cycles into six segments. The first segment, designated CN, is the first 31 seconds cold cycle which is characteristic of very low conversion performance. C1 is interval between 31 and 205 seconds of the cold cycle characteristic of accelerating conversion performance. C2 is the remaining of the five cold cycles between 205 and 505 seconds characteristic of semi-stable conversion performance. Interval 4 (ST) is the time interval of the entire (13) stabilized cycles characteristic of stable conversion performance. H1 is the first 205 seconds of hot cycle characteristic of accelerating conversion performance. H2 is the remaining five hot cycles characteristic of semi-stable conversion performance. The predicted values are derived by inserting the actual values obtained in a formula as described in the publication of the *Society of Automotive Engineers*.

Since large quantities of catalyst must be prepared for evaluation in the engine test, a bench test was devised that would correlate with the engine test and would require the preparation of only small quantities of catalyst.

The bench test is designed to simulate the exhaust gas composition in heatup conditions experienced by a catalyst during the initial part of the actual chassis dynamometer run. The test approximates the environment the catalyst will experience during all important cold start and cold segment of the chassis test which accounts for a substantial portion of the total carbon monoxide emitted. The simulated exhaust gas contains 1600 parts per million carbon as propane, 4.5 volume percent oxygen, 10.0 volume percent water vapor, 3.0 volume percent carbon monoxide with the balance being nitrogen. The gas mixture is preheated so that the inlet gas temperature to the bed of catalyst is 600°F. As the hot gas passes through the room temperature catalyst the bed begins to heat up in a manner similar to the heat up in an actual catalytic device on an automobile. When the temperature in the bed becomes high enough, catalytic oxidation of the carbon monoxide and hydrocarbon in the stream commences and the temperature increases at an accelerated rate due to the heat of reaction. Catalyst performance is measured by determining the time and/or temperature relationships for given conversion of carbon monoxide and hydrocarbons. The more active catalysts tested in the engine test are those catalysts which in the bench test are characterized by the lowest $\Delta t$ and the highest hydrocarbon efficiency. $\Delta t$ is a measure of the time required to oxidize from 10 to 90% of the carbon monoxide in the simulated exhaust gas composition to carbon dioxide. Hydrocarbon efficiency refers to the maximum conversion of hydrocarbon observed after a specified time (10 minutes). This bench test is essentially a scaled down version of the engine test previously described. Carbon monoxide is determined by non-dispersive infrared analysis and hydrocarbon is determined by flame ionization analysis.

Our invention is illustrated by the following specific but nonlimiting examples.

EXAMPLE 1

This example illustrates a satisfactory method for preparing the noble metal catalyst. A total of 125 g. of chloroplatinic acid (40% platinum) were dissolved in 3 liters of deionized water. The solution was made basic by adding a solution containing 225 g. of sodium carbonate in 1 liter of water. A solution containing 225 g. of sodium bisulfite (NaHSO$_3$) in 1 liter of water was added to this solution. A precipitation occurred immediately. The slurry was stirred for an additional 30 minutes to ensure that all the chloroplatinic acid had been reduced to divalent platinum. The final solution was clear and the precipitate white. The solution was cooled in an ice bath to ensure complete precipitation of the platinum sulfito complex.

The slurry is then filtered, washed with several portions of cold dilute ammonium hydroxide solution prepared to contain 10 ml. of concentrated ammonium hydroxide in 1 liter of solution. The precipitate was washed with acetone to aid in drying. The white solid was dried at 110°C. The product had the formula Na$_6$PT(SO$_3$)$_4$ and contained 28.4% platinum. The product was thermally stable to above 300°C.

The sodium palladium sulfito complex was prepared by diluting 200 ml. of a palladium nitrate solution prepared to contain 0.1 g. of palladium per ml. to 2 liters with water. A total of 120 g. of sodium bisulfite (NaHSO$_3$) in 500 ml. of water and 250 g. of sodium carbonate in 1 liter of water were mixed and poured slowly into the well stirred palladium nitrate solution. Considerable quantities of carbon dioxide were evolved. The resulting solution was stirred for a short time, cooled in an ice bath and filtered. The light yellow solid was washed with small quantities of very dilute cold ammonium hydroxide followed by washes with acetone. The product Na$_6$Pd(SO$_3$)$_4$ was dried at 110°C. The salt decomposes at about 325°C. and was found to contain 18.47% palladium.

The impregnation solution was prepared by adding the sodium platinum sulfito complex and the sodium palladium sulfito complex to a small amount of water. Dilute nitric acid was slowly added over a period of 10 to 15 minutes till the salts dissolved. The final pH of the solution was about 5. The solution was finally diluted to the desired volume and sprayed to incipient wetness on a ceria stabilized alumina base that had been calcined for 1 hour at 1800°F. The impregnated base was dried at 300°F. and calcined for 2 hours at 1200°F. The catalyst contained 0.043 wt. percent platinum and 0.013 wt. percent palladium.

EXAMPLE 2

This example illustrates an alternate method of preparing a specific mixed sodium platinum-palladium sulfito complex. A total of 20 g. of chloroplatinic acid (H$_2$PtCl$_6$·6H$_2$O) containing 40% platinum and 32 ml. of a palladium nitrate solution containing 0.1 g. of palladium per ml. were dissolved in 1 liter of deionized water. A solution was prepared to contain 60 g. of sodium bisulfite (Na HSO$_3$) in 1 liter of water which was added to the palladium platinum salt solution. The resulting solution was neutralized by adding a solution of sodium carbonate prepared to contain 60 g. of sodium carbonate and 1 liter of water. A light yellow precipitate formed when the solution began to turn basic. After settling for 15 minutes the solution was cooled, filtered, washed with a small quantity of cold dilute ammonium hydroxide solution followed by an acetone wash and the product was dried at 100°C. for 30 minutes. A yield of 96% of the theroetical was recovered, the product, Na$_6$Pt$_{0.58}$Pd$_{0.42}$(SO$_3$)$_4$ was found by analysis to contain 25.23% Pt-Pd and had a decomposition temperature of 335°C.

EXAMPLE 3

This example illustrates the method of preparing the ammonium salt of the platinum sulfito complex.

A total of 41 grams of chloroplatinic acid (40% platinum) was dissolved in 250 ml. of water. Two hundred ml. of ammonium bisulfite solution (prepared as a concentrated solution by dissolving ammonium carbonate (NH$_4$)$_2$CO$_3$ in concentrated ammonium hydroxide solution) was added with considerable effervescence and a slight exotherm. The slurry was then cooled to 10°C. in an ice bath and was filtered. The filter cake was reslurried in concentrated ammonium carbonate-ammonium hydroxide solution and then refiltered. The voluminous white precipitate was then slurried in ethanol, filtered and washed with more ethanol and finally dried in vacuo at 105°C.

A yield of 70% of the theoretical was recovered; the product (NH$_4$)$_6$Pt(SO$_3$)$_4$ was found by analysis to contain 31.47% platinum. The fluffy white powder is readily soluble in water and had a decomposition temperature of over 250°C.

EXAMPLE 4

This example illustrates a method for preparing the ammonium palladium complex.

A complex of 19 g. of palladium nitrate Pd(NO$_3$)$_2$ containing 46.81% palladium was treated with 40 ml. of concentrated ammonium bisulfite solution. The reaction occurred immediately with a formation of a green solid. The mixture was allowed to stand for 1 hour after which it was filtered and washed with a small quantity of cold water. It was then dispersed in ethanol, filtered and washed with more ethanol. It was dried at 105°C. in vacuo yielding 20.1 g. of product which contains 36.33% Pd. This represents a yield of 77%. The empirical formula of the product was $(NH_4)_2Pd(SO_3)_2$. The $NH_4+$/palladium molar ratio of the compound was found to be 2.34 to 1.

EXAMPLE 5

3250 grams of an alumina support which contains 5% ceria expressed as $Ce_2O_3$ was impregnated to approximately 30% of its pore volume with 345 ml. of a solution containing 622 mg. of palladium from palladium nitrate and 10.25 g. of cerous nitrate $Ce(NO_3)_3 \cdot 6H_2O$. To the remainder of the pore volume was added a solution containing 4.144 g. of the ammonium platinum sulfito complex dissolved in 805 ml. of $H_2O$. The impregnated support was oven dried at 320°F. for 4 hours after which it was calcined for 2 hours at 1200°F. The finished catalyst contains .017 wt. percent palladium and 0.042 wt. percent platinum.

EXAMPLE 6

3.26 grams of chloroplatinic acid (containing 1.304 grams of Pt) was dissolved in 600 cc. of water and brought to boiling. Ten milliliters of a solution of sodium bisulfite (containing 3 grams of $NaHSO_3$) was added, after which boiling was continued for 5 minutes. 5.22 cc. of a palladium nitrate solution (containing 522 mg. palladium) was added and the solution was then diluted to 1020 cc. It was then impregnated onto 3240 grams of alumina extrudates containing 5% ceria expressed as $Ce_2O_3$. The impregnated extrudates were dried at 300°F. for 2 hours. This catalyst was activated in a 5% $H_2$/95% $N_2$ atmosphere at 650°F. for ½ hour.

EXAMPLE 7

The procedure used for the sodium complexes above was repeated except that 6 cc. of ammonium bisulfite solution (containing 45% by weight $NH_4HSO_3$) was substituted for the $NaHSO_3$.

EXAMPLE 8

This example illustrates the effectiveness of the sulfito complex in allowing lower levels of noble metals to be used. This catalyst is prepared from the sulfito complexes using gaseous sulfur dioxide.

0.913 g. of chloroplatinic acid was dissolved in 600 ml. of water and brought to boiling. Sulfur dioxide was introduced through a gas dispersion tube for 3½ minutes at a flow rate of 0.7 g. of sulfur dioxide per minute. After sulfur dioxide addition was stopped, boiling continued for 5 more minutes. The platinum sulfito complex was cooled to room temperature and 1.46 ml. of palladium nitrate solution containing 146 mg. of palladium was added. The total solution volume was adjusted to 1200 ml. and applied to 1845 g. of gamma alumina extrudates. The impregnated extrudates was dried at 300°F. then activated in a 5 volume percent hydrogen balance nitrogen atmosphere for ½ hour at 650°F. The final catalyst contains 0.008 weight percent palladium and 0.020 weight percent platinum.

EXAMPLE 9

This example illustrates the preparation of a platinum-palladium sulfito complex using gaseous sulfur dioxide.

A total of 1.892 grams of chloroplatinic acid (containing 0.757 grams of platinum) was dissolved in 600 ml. of water and brought to boiling, at which time sulfur dioxide was bubbled through a gas dispersion tube at a rate of 0.5 g. of sulfur dioxide per minute. The sulfur dioxide addition was continued for 7½ minutes. The boiling was continued for an additional 5 minutes after sulfur dioxide addition ceased. The solution was then cooled to room temperature in an ice bath and 3.1 cc. of a palladium nitrate solution containing 100.5 milligrams palladium per ml. was added.

The solution was stirred and transferred to a reservoir for use in impregnating the alumina extrudates that had a surface area of 96 m²/g. and pore volume of 0.62 cc/g. The impregnation was carried out by passing the solution from the reservoir in a steady stream into 2000 g. of support in a mixing bowl. The impregnated extrudates were then transferred to trays and placed in an oven and heated to 320°F. The drying was continued for a period of 2 hours and activation was then carried out by heating to a temperature of 800°F. for 1 hour.

To illustrate the improvement in catalyst performance when sulfito complexes of this invention are employed, we include a catalyst which has been prepared by impregnating the same quantity of platinum and palladium as in Examples 1, 2, 5, 6 and 8 onto an alumina base using chloroplatinic acid and palladium nitrate solutions. The data for this preparation are set out in Table 1 below:

TABLE 1

| Catalyst | Predicted Results for a Prototype 1975 GM Test Vehicle, gms/mile | |
|---|---|---|
| | HC | CO |
| Non-Sulfito | 0.228 | 2.278 |

When the same test procedure was performed using the catalysts prepared by the methods of Examples 1, 2, 5, 6, 7 and 8 greatly improved results were obtained. The data are set out in Table II.

TABLE II

| Catalyst Example | Method of Addition of Sulfito Complex | Predicted Results for a Prototype 1975 GM Test Vehicle, gms/mile | |
|---|---|---|---|
| | | HC | CO |
| 1 | $Na_6Pt(SO_3)_4$ | 0.207 | 2.516 |
| 1 | $Na_6Pd(SO_3)_4$ | 0.148 | 1.773 |
| 2 Mixed Salt | $Na_6Pt_{.58}Pd_{.42}(SO_3)_4$ | 0.156 | 1.939 |
| 2 Mixed Salt | $Na_6Pt_{.35}Pd_{.65}(SO_3)_4$ | 0.152 | 1.836 |
| 2 Mixed Salt | $Na_6Pt_{.18}Pd_{.82}(SO_3)_4$ | 0.138 | 1.770 |
| 5 | $(NH_4)_6Pt(SO_3)_4$ | 0.166 | 2.012 |
| 6 | Nonisolated Sodium Sulfito Complexes | 0.150 | 1.841 |
| | $H_2$ Reduced Air Calcined | 0.164 | 1.933 |
| 7 | Nonisolated Ammonium Sulfito Complexes | 0.153 | 1.787 |
| 8 | Gaseous Sulfur Dioxide | 0.155 | 1.866 |

TABLE II-continued

| Catalyst Example | Method of Addition of Sulfito Complex | Predicted Results for a Prototype 1975 GM Test Vehicle, gms/mile | |
|---|---|---|---|
| | | HC | CO |
| 8 | (.028% Total Noble Metal) Gaseous Sulfur Dioxide (.056% Total Noble Metal) | 0.140 | 1.832 |

It is apparent from these data that results obtained on catalysts prepared from the platinum-palladium sulfito complexes exhibit a substantial improvement in carbon monoxide and hydrocarbon oxidation activity over mixed platinum-palladium catalysts prepared by conventional means. Catalysts prepared from $Na_6Pt(SO_3)_4$ alone are only moderately active as automotive exhaust oxidation catalysts. At least some palladium needs to be present along with the platinum.

EXAMPLE 10

This example illustrates that using the platinum and palladium sulfito complexes, active catalysts can be prepared on low grade supports such as raw bauxite ore.

A total of 58.9 mg. of the sodium platinum sulfito complex (containing 28.8% Pt) and 36.7 mg. of the sodium palladium sulfito complex (containing 18.5% Pd) were mixed with 30 ml. water and brought to boiling. After 10 minutes of boiling the complexes completely dissolved. The solution was then applied by impregnation to 49.5 grams of bauxite extrudates which has been calcined at 1650°F. for 1 hour and have a surface area of 120 m²/g. and pore volume of 0.6 cc/g. The impregnated bauxite extrudates were dried at 300°F. for 1 hour. They were then activated in a 5 volume percent hydrogen-balance nitrogen atmosphere at 650°F. for ½ hour.

EXAMPLE 11

This example illustrates that the sulfito complexes allow the degree of platinum and palladium penetration to be controlled by the pH of the impregnating solution.

A total of 391 mg. of chloroplatinic acid (40% platinum) was dissolved in 60 ml. of water and heated to boiling. Gaseous sulfur dioxide was added for 13½ minutes at a rate of 0.3 g. of sulfur dioxide per minute. After sulfur dioxide addition was stopped boiling continued for 5 minutes. The solution was cooled to room temperature at which time 6.26 ml. of palladium nitrate solution containing 100.5 mg. palladium per ml. was added. The total volume was increased to 210 ml. and then the solution split into three equal portions. Two solutions were treated with nitric acid to adjust the pH to 0.93 and 0.42, respectively. The untreated sample had a pH of 1.5. Each solution was impregnated onto 139 grams of alumina extrudates. The impregnated extrudates were dried at 300°F. and finally activated in air at 800°F. for 1 hour. It was observed that the lower the pH the greater the degree of penetration into the extrudate particle.

EXAMPLE 12

This example illustrates the preparation of the palladium sulfito complex by the gaseous sulfur dioxide procedure and the subsequent use in preparing a catalyst.

3.65 ml. of palladium nitrate solution containing 10 mg. palladium per ml. was mixed with 80 ml. of water. Gaseous sulfur dioxide was bubbled in through a gas dispersion tube for one minute at a rate of 0.5 g. sulfur dioxide per minute. The color changed immediately from brown to green. This solution was then applied by impregnation to 132 g. of gamma alumina extrudates having a surface area of 114 m²/g. and a pore volume of 0.65 cc/g. The impregnated extrudates were dried and finally activated in air at 800°F. for 1 hour. This catalyst contains 0.028% by weight palladium.

Bench scale activity results of Examples 8–12 are setforth in Table III. Several engine tested samples are included for reference.

TABLE III

| Catalyst Example | Bench Activity Data | |
|---|---|---|
| | CO t-Seconds | HC Efficiency — % |
| Non-sulfito | 48.2 | 56.0 |
| 8(.028% Total noble metal) | 24.1 | 81.2 |
| 8(.056% Total noble metal) | 18.7 | 86.7 |
| 9(Preferred sulfito complex) | 21.3 | 83.1 |
| 10(Bauxite support) | 23.2 | 81.6 |
| 11(pH =1.5) | 26.2 | 83.6 |
| 11(pH =.93) | 23.1 | 83.2 |
| 11(pH =.42) | 27.2 | 74.4 |
| 12(.028% Palladium) | 19.9 | 81.8 |

What is claimed is:

1. A process for preparing an auto exhaust conversion catalyst characterized by substantially improved conversion of carbon monoxide and hydrocarbons consisting essentially of the following steps:
   a. preparing a solution from a platinum, palladium or platinum-palladium complex salt having the formula $M_6(X)(SO_3)_4$ or $M_2(X)(SO_3)_2$ wherein M is Na+, $NH_4$+ or H+ and X is platinum, palladium or a mixture of platinum and palladium,
   b. impregnating a base selected from the group consisting of alumina, silica-alumina, mullite, cordierite and zirconia with said solution,
   c. drying and activating by heating in air at a temperature of 800° to 1400°F. for 1 to 4 hours or in a reducing environment at a temperature of 600° to 800°F. for 0.5 to 2 hours, and
   d. recovering the catalyst product.

2. The process according to claim 1 wherein the base is alumina stabilized by the addition of about 5 weight percent ceria.

3. The process according to claim 1 wherein the platinum, palladium or mixture of platinum-palladium sulfito complex salts are prepared by treating solutions of chloroplatinic acid, palladium nitrate or mixtures thereof with sodium bisulfite followed by precipitating, washing and drying steps.

4. The process according to claim 1 wherein the platinum, palladium or mixture of platinum-palladium sulfito complex salts are prepared by treating solutions of chloroplatinic acid, palladium nitrate or mixtures thereof with ammonium bisulfite followed by precipitating, washing and drying steps.

5. The process according to claim 1 wherein the platinum-palladium sulfito complex salts are prepared by treating solutioins of a mixture of chloroplatinic acid and palladium nitrate with gaseous sulfur dioxide.

6. The process according to claim 1 wherein the platinum and palladium content can vary from $Pt_{0.99}Pd_{0.01}$ to $Pt_{0.01}Pd_{0.99}$.

* * * * *